US011149096B2

(12) United States Patent
Al-Haj Ali et al.

(10) Patent No.: US 11,149,096 B2
(45) Date of Patent: Oct. 19, 2021

(54) METHOD OF RECOVERING OLEFINS IN A SOLUTION POLYMERIZATION PROCESS

(71) Applicant: Borealis AG, Vienna (AT)

(72) Inventors: Mohammad Al-Haj Ali, Porvoo (FI); Erik Eriksson, Stenungsund (SE); Guhan Mathivanan, Linz (AT); Jukka Räsänen, Tolkkinen (FI); Henry Sleijster, Geleen (NL); Sameer Vijay, Linz (AT); Samuli Zitting, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/646,606

(22) PCT Filed: Nov. 22, 2018

(86) PCT No.: PCT/EP2018/082172

§ 371 (c)(1),
(2) Date: Mar. 12, 2020

(87) PCT Pub. No.: WO2019/110315

PCT Pub. Date: Jun. 13, 2019

(65) Prior Publication Data

US 2020/0277413 A1    Sep. 3, 2020

(30) Foreign Application Priority Data

Dec. 4, 2017    (EP) .................................... 17205098

(51) Int. Cl.
*C08F 6/00*    (2006.01)
*C08F 2/06*    (2006.01)

(52) U.S. Cl.
CPC ................ *C08F 6/003* (2013.01); *C08F 2/06* (2013.01)

(58) Field of Classification Search
CPC .... C08F 6/02; C08F 6/03; C08F 6/003; C08F 23/0815
(Continued)

(56) References Cited

U.S. PATENT DOCUMENTS 7,060,865 B2    6/2006    Ding et al.
2018/0355075 A1*    12/2018    Ali .......................... C08F 6/003

FOREIGN PATENT DOCUMENTS

CA    2827839 A1    3/2015
EP    0813567 A1    12/1997
(Continued)

OTHER PUBLICATIONS

International Search Report for PCT/EP2018/082172, dated Mar. 1, 2019.

*Primary Examiner* — William K Cheung
(74) *Attorney, Agent, or Firm* — Fay Sharpe LLP

(57) ABSTRACT

The present invention relates to a process for removing hydrocarbons comprising the steps of: (A) passing a stream of a solution into a separator wherein a liquid phase comprising polymer and a vapor phase coexist; (B) withdrawing a vapor stream and a concentrated solution stream from the separator; (C) passing at least a part of the vapour stream into a first fractionator; (D) withdrawing a first overhead stream and a first bottom stream from the first fractionator; (E) passing the first bottom stream to a second fractionator; (F) withdrawing a second overhead stream and a second bottom stream from the second fractionator; characterized in that at least a part of the second overhead stream is withdrawn as a purge stream.

12 Claims, 1 Drawing Sheet

(58) Field of Classification Search
USPC .......................................................... 526/71
See application file for complete search history.

(56) References Cited

FOREIGN PATENT DOCUMENTS

EP          2295474  A1    3/2011
WO    WO 2009090254  A1    7/2009

* cited by examiner

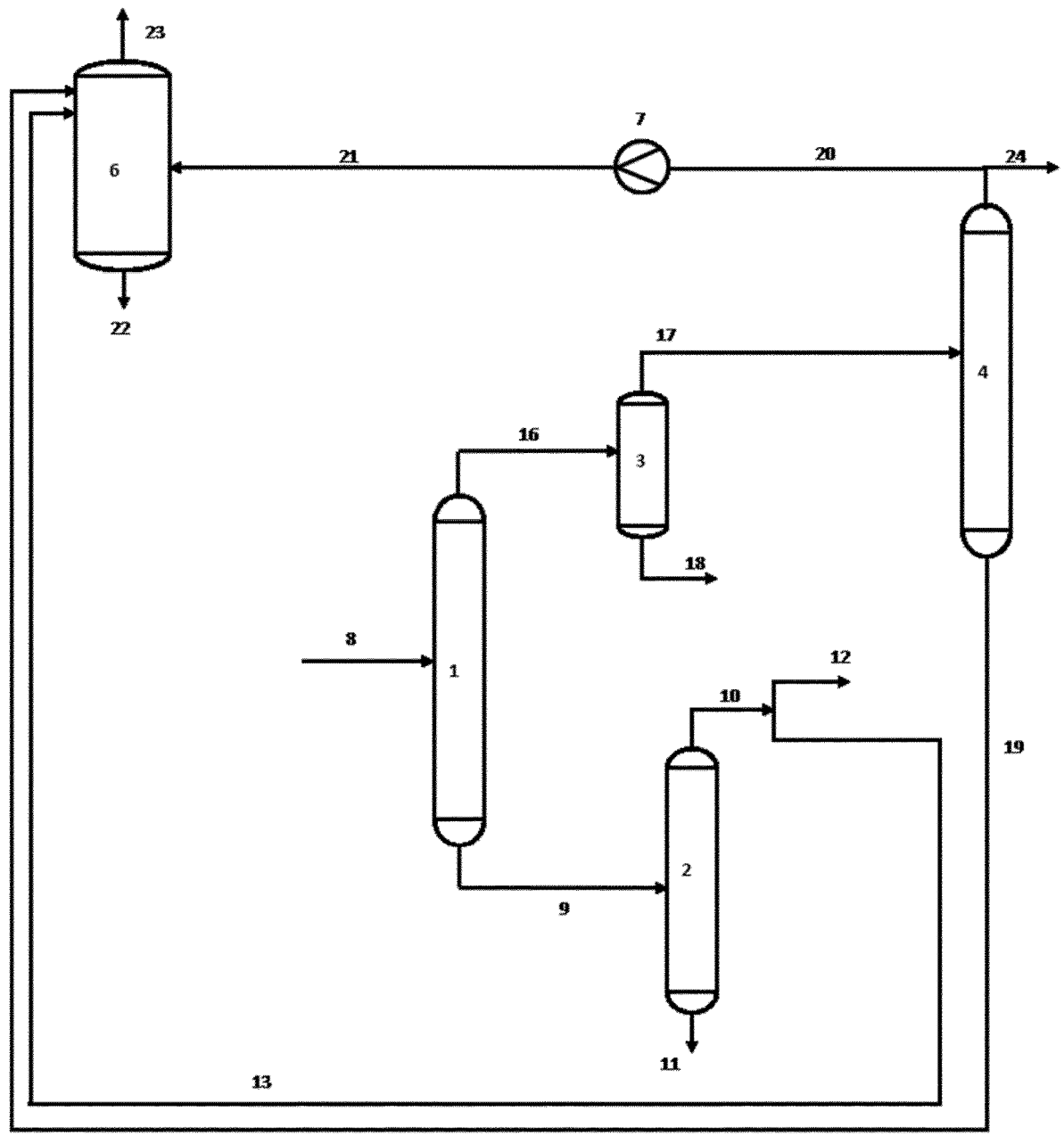

METHOD OF RECOVERING OLEFINS IN A SOLUTION POLYMERIZATION PROCESS

CROSS-REFERENCE TO RELATED APPLICATIONS

This is a 371 of PCT/EP2018/082172, filed Nov. 22, 2018, which claims priority to European Patent Application No. 17205098.1, filed Dec. 4, 2017, the contents of which are fully incorporated herein by reference.

FIELD OF THE INVENTION

The present invention relates to a solution polymerization process. More specifically, the present invention deals with separating and removing the inert components of the reaction mixture downstream of the polymerization process.

Problem to be Solved

It is known to produce olefin polymers in solution polymerisation process where the unreacted monomer and comonomer and the solvent are separated from the solution and recycled to the polymerisation process.

WO-A-2009/013217 discloses a process for separating a hydrocarbon-containing feed stream downstream of an olefin polymerization process. Separation of olefin monomer, comonomer and hydrocarbon diluent is described.

WO-A-2009/090254 discloses a process for recovering unreacted monomer from a slurry or a gas phase polymerization process.

In spite of the prior art there still remains a need for an efficient process for separating and recovering inert components originating from the comonomer from the polymer solution in a solution polymerization. For example 1-octene contains small amounts of isomers of octane and octene which are not active towards polymerization. Thus these components start to accumulate in the process making it less efficient. Polymer density control becomes difficult if the inert components are not removed. The present invention provides an efficient process for separating and removing the inert $C_8$ components.

SUMMARY OF THE INVENTION

The present invention provides a process for removing hydrocarbons comprising the steps of:
- (A) passing a stream of a solution into a separator wherein a liquid phase comprising polymer and a vapour phase coexist;
- (B) withdrawing a vapour stream and a concentrated solution stream from the separator;
- (C) passing at least a part of the vapour stream into a first fractionator;
- (D) withdrawing a first overhead stream and a first bottom stream from the first fractionator;
- (E) passing the first bottom stream to a second fractionator;
- (F) withdrawing a second overhead stream and a second bottom stream from the second fractionator;

characterized in that at least a part of the second overhead stream is withdrawn as a purge stream.

DESCRIPTION OF DRAWINGS

The FIGURE shows a flow diagram of a fractionation process, where inert $C_8$ components are removed via a purge.

DETAILED DESCRIPTION

The present invention is directed to a process for polymerizing one or more olefins in one or more polymerisation reactors in solution. The solution polymerisation process is typically conducted in a solvent in which the monomer, eventual comonomers, eventual chain transfer agent and the polymer formed in course of the process are dissolved. Such processes are disclosed, among others, in WO-A-1997/036942, WO-A-2006/083515, WO-A-2008/082511, and WO-A-2009/080710.

Polymerization

The polymerization may be conducted in one or more polymerization reactors. It is obvious that where the text refers to one polymerization reactor it can be equally applied to more than one reactor, and in specific to any one of the reactors.

In the polymerization reactor olefin monomers having two or more carbon atoms, one or more catalyst systems, optionally one or more comonomers, optionally one or more chain transfer agents, and optionally one or more diluents or solvents are used for conducting a polymerization. Thus, the polymerization system is in its dense fluid state and comprises the olefin monomers, any comonomer present, any diluent or solvent present, any chain transfer agent present, and the polymer product.

The olefin monomer is an alpha-olefin having two or more carbon atoms, preferably from 2 to 10 carbon atoms. More preferably the olefin monomer is selected from the group consisting of ethylene, propylene and 1-butene. Especially preferably the olefin monomer is ethylene.

One or more comonomers are optionally and preferably present in the polymerization reactor. The comonomer is selected from the group consisting of alpha-olefins different from the olefin monomer having from 2 to 10 carbon atoms; polyenes, such as non-conjugated alpha-omega-dienes, having from 4 to 10 carbon atoms, cyclic olefins having from 6 to 20 carbon atoms and cyclic polyenes having from 6 to 20 carbon atoms. Preferably, the comonomer is selected from the group of alpha-olefins different from the olefin monomer having from 2 to 10 carbon atoms, such as 1-butene, 1-hexene and 1-octene when the olefin monomer is ethylene; and ethylene, 1-butene and 1-hexene when the olefin monomer is propylene.

1-octene is one of the typically used comonomers in solution polymerization. 1-octene typically contains 3-4% isomers of octane and octene which are not active towards polymerization, e.g. iso or tertiary octenes or n-octane. Since these components are inert to polymerisation they start to accumulate in the process.

The polymerization catalyst may be any catalyst known in the art which is capable of polymerizing the monomer and the optional comonomer. Thus, the polymerization catalyst may be a Ziegler-Natta catalyst as disclosed in EP-A-280352, EP-A-280353 and EP-A-286148, or it may be a metallocene catalyst as disclosed in WO-A-1993025590, U.S. Pat. No. 5,001,205, WO-A-1987003604 and U.S. Pat. No. 5,001,244, or it may be a combination of these. Also other suitable catalysts, such as late transition metal catalysts, can be used.

A chain transfer agent may be used for controlling the molecular weight of the polymer as it is known in the art. A suitable chain transfer agent is, for instance, hydrogen.

The solvent is suitably present in the polymerization process. The solvent may be any suitable straight-chain or branched alkyl having from 3 to 7 carbon atoms, a cyclic alkyl, optionally having alkyl substituents or an aryl, optionally having alkyl substituents, or a mixture of two or more of the above-listed compounds. The solvent must be inert towards the polymerization catalyst and the monomers. Further, it should be stable in the polymerisation conditions. It further must be able to dissolve the monomer, the eventual comonomers, the eventual chain transfer agent and the polymer in the polymerization conditions.

The temperature in the polymerization reactor is such that the polymer formed in the polymerization reaction is completely dissolved in the reaction mixture comprising the solvent, the comonomer(s), the chain transfer agent and the polymer. The temperature is suitably greater than the melting temperature of the polymer. Thus, when the polymer is a homo- or copolymer of ethylene the temperature is suitably from 120° C. to 220° C., such as from 150° C. to 200° C., depending on the content of comonomer units in the polymer. When the polymer is a homo- or copolymer of propylene the temperature is suitably from 165° C. to 250° C., such as from 170° C. to 220° C., depending on the content of comonomer units in the polymer.

The pressure in the polymerization reactor depends on the temperature, on one hand, and the type and the amount of the comonomer, on the other hand. The pressure is suitably from 50 to 300 bar, preferably from 50 to 250 bar and more preferably from 70 to 200 bar.

The residence time is short, typically less than 10 minutes.

The process is suitably operated continuously. Thereby streams of monomer, catalyst, and when present streams of comonomer, chain transfer agent and solvent are passed to the polymerisation reactor. A product stream, comprising the unreacted monomer, dissolved polymer and eventual unreacted comonomer and chain transfer agent as well as the eventual solvent is withdrawn from the reactor.

Recovery of Components

The product stream is continuously or intermittently, preferably continuously, withdrawn from the polymerization reactor. The product stream is then passed to a separation step where a liquid phase comprising the polymer and a vapour phase coexist.

The product stream may be separated in any process step where volatile compounds can be withdrawn from solution. Typically such a process step involves pressure reduction and preferably also heating of the solution. One typical example of such a process step is flashing. For instance, the product stream is heated and then passed along a pipe to a receiving vessel which is operated at a pressure which is substantially lower than the pressure in the polymerization reactor. Thereby a part of the fluid contained in the solution evaporates and is withdrawn as a vapour stream. The part remaining in the solution with the polymer forms a first concentrated product stream.

Preferably the product stream is heated so that a heated stream is produced. Typically, the temperature of the heated stream is from 200° C. to 300° C., preferably from 210° C. to 270° C. and more preferably from 210° C. to 250° C. Preferably the temperature of the heated stream is from 10° C. to 120° C., more preferably from 20° C. to 100° C. greater than the temperature of the solution in the polymerization reactor.

The pressure of the product stream is reduced so that the pressure is within the range of from 1 to 15 bar, preferably from 2 to 12 bar and more preferably from 5 to 10 bar. The pressure is preferably reduced so that it is at least from about 40 bar to about 295 bar lower than the pressure in the polymerization reactor.

In a preferred embodiment the separating step is a flashing step. Thereby a liquid phase and a vapour phase are present in the separating step. The flashing step is suitably conducted in a flash vessel which is a vertical vessel preferably having a generally cylindrical shape. Thereby the flash vessel has a section which has approximately a circular cross-section. Preferably the flash vessel has a cylindrical section which has a shape of a circular cylinder.

In addition to the cylindrical section the flash vessel may have additional sections, such as a bottom section, which may be conical, and a top section which may be hemispherical. Alternatively, the flash vessel may also have a generally conical shape.

The temperature in the flash vessel is typically from 130 to 250° C. The temperature should be sufficiently high to keep the viscosity of the solution at a suitable level but less than the temperature where the polymer is degraded. The pressure in the flash vessel is typically from 15 bar to atmospheric, or even less than atmospheric.

The product stream enters the flash vessel at the top. The solution travels downwards in the flash vessel while the gases which evaporate from the solution travel upwards. According to this preferred embodiment the polymer solution forms a thin film which falls downwards in the flash vessel. This facilitates the removal of hydrocarbons from the polymer solution. The gases are typically withdrawn from the top of the flash vessel while the solution is withdrawn from the bottom.

According to an especially preferred embodiment the product stream is sprayed in the flash vessel. The spraying can be done by using one or more suitable nozzles which disperse the solution stream into droplets. Such nozzles are well known in the industry and include air atomising nozzles, flat fan nozzles, hollow cone nozzles and full cone nozzles. Preferably the nozzles break the stream into droplets having the size of not more than about 1 mm.

The nozzle forms a stream of droplets in the flash vessel. The stream of droplets then coagulates within the flash vessel and forms a falling film having a relatively high surface area. This enhances the mass transfer of the volatile components from the solution.

As described above the flash vessel can have a vertical generally cylindrical shape. Then the stream of droplets is directed tangentially with the wall of the flash vessel by a suitable position of the nozzle. Thus, the nozzle is suitably located relatively near to the wall so that its outlet is directed tangentially with the wall. When the stream of the droplets exits the nozzle it moves in the direction of the wall forming a downwards falling film. It is also possible that the flash vessel has a vertical generally conical shape. In such embodiment it is possible to direct the stream of the droplets tangentially with the wall of the flash vessel, as described above. However, it is also possible direct the droplets axially towards the wall of the flash vessel. The nozzle or the nozzles are then arranged eccentrically within the flash vessel. In both arrangements the polymer solution forms a falling film within the flash vessel.

The polymer content in a first concentrated product stream withdrawn from the flashing stage is typically from 35 to 99% by weight. In other words, the first concentrated product stream withdrawn from the first flashing stage contains from 1 to 65% by weight of residual hydrocarbons.

When viewed from a different angle, the hydrocarbon stream withdrawn from the flash vessel is from 35 to 80% by weight from the total material streams withdrawn from the flash vessel. The hydrocarbon stream typically comprises unreacted monomer and also solvent and unreacted comonomer.

By using the flash as described above it is possible to achieve high separation efficiency. For instance, separation efficiency for hydrocarbons containing 6 carbon atoms is at least 75% and preferably at least 80%. Additionally still, separation efficiency for hydrocarbons containing 8 carbon atoms is at least 60% and preferably at least 65%. The separation efficiency is defined as the mass flow of the component withdrawn in the vapour stream divided by the (theoretical) mass flow rate of the component in the vapour stream in equilibrium conditions.

The first concentrated product stream contains the polymer, dissolved in solvent and unreacted comonomer. It may also contain residual monomer which still remains in the solution. Typically the polymer concentration in the first concentrated product stream is from 40% by weight to 90% by weight, preferably from 50 to 80% by weight and most preferably from 60 to 75% by weight, based on the total weight content of the first concentrated product stream. The first concentrated production stream is then typically in liquid phase. The first concentrated product stream may, however, contain a minor amount of vapour, such as vapour bubbles. The amount of vapour in the first concentrated product stream is typically not more than 40% by volume, preferably not more than 30% by volume and especially preferably not more than 20% by volume, such as not more than 10% by volume or not more than 5% by volume.

The vapour stream contains unreacted monomer and other volatile compounds, such as hydrogen. The vapour stream may also contain some of the solvent and comonomer. The vapour stream can optionally comprise a small amount of liquid droplets. The amount of such droplets is typically not more than 40% by volume, preferably not more than 30% by volume and especially preferably not more than 20% by volume.

The first concentrated product stream is then passed to subsequent process steps. Preferably the subsequent process steps include at least one further separation step, more preferably at least two further separation steps. Such further separation steps can be performed, for instance, in a similar way as in the separation step described above. Further vapour streams are withdrawn from further separation steps.

In a preferred embodiment of the invention the product stream is passed to three subsequent flashing steps.

From any of the separation and further separation steps a part of the vapour or further vapour streams can be directed to a fractionation step, preferably to a first fractionator.

A stream of a solution denotes hereinafter the product stream withdrawn from the polymerization reactor, the first concentrated product stream withdrawn from a first separator, a second concentrated product stream withdrawn from a second separator or any other concentrated product stream withdrawn from any subsequent separator.

A separator denotes hereinafter the first separator, the second separator, a third separator or any subsequent separator.

A concentrated solution stream denotes hereinafter the solution stream withdrawn from the separator.

A vapour stream denotes hereinafter any of the vapour or further vapour streams or a combination of them.

In the present invention, a stream of a solution preferably comprising 1-octene and a solvent comprising 3-7 carbon atoms, such as n-hexane, is passed to a separator. In the separator a liquid phase comprising the polymer and a vapour phase coexist. A concentrated solution stream and a vapour stream are withdrawn from the separator. At least a part of the vapour stream is passed to a first fractionator. A part of the vapour streams from any of the preceding separation steps can also be passed to the first fractionator.

A first overhead stream and a first bottom stream are withdrawn from the first fractionator. The first fractionator may be any device where the first overhead stream can be separated from the first bottom stream. It is suitably a distillation column or a stripping column. The first bottom stream comprises 1-octene and hydrocarbons having 9 or more carbon atoms. The first overhead stream comprises solvent, monomer and nitrogen.

The first bottom stream from the first fractionator is passed to a second fractionator. The second fractionator may be any device suitable for separating a second overhead stream from a second bottom stream. As discussed above for the first fractionator, the second fractionator is also suitably a distillation column or a stripping column. The second overhead stream comprising 1-octene and the second bottom stream comprising hydrocarbons having 9 or more carbon atoms are withdrawn from the second fractionator. A part of the second overhead stream may be passed to the polymerization reactor via a feed vessel. The second overhead stream may be subjected to extra steps, such as a purification step, before entering the feed vessel.

In the present invention, a part of the second overhead stream is withdrawn as a purge stream. Inert 08 components, such as isomers of 1-octene and n-octane, are removed in the purge stream. The purge stream can be recovered and further used as a gasoline additive or a fuel additive to enhance octane value of the fuel. The value of the purge stream can be increased by isomerisation and/or hydrogenation. In a preferred aspect of the invention, the purge stream is recovered and further used. In a more preferred aspect of the invention, the purge stream is recovered, subjected to an isomerisation and/or hydrogenation treatment and further used.

The first overhead stream from the first fractionator is passed to a third fractionator. The third fractionator may be any device suitable for separating a third overhead stream from a third bottom stream, for example a distillation column, a stripping column, a multi-phase separator, an extractor or a liquid-liquid separator. The third overhead stream comprising monomer and solvent and the third bottom stream are withdrawn from the third fractionator.

The third overhead stream from the third fractionator is passed to a fourth fractionator. The fourth fractionator may be any device suitable for separating a fourth overhead stream from a fourth bottom stream. The fourth fractionator is suitably a distillation column or a stripping column. The fourth overhead stream comprising monomer and the fourth bottom steam comprising solvent are withdrawn from the fourth fractionator. A part of the fourth bottom stream may be passed to the polymerization reactor via the feed vessel. A part of the fourth overhead stream may be passed to the polymerization reactor via the feed vessel. The fourth bottom and overhead streams may be subjected to extra steps, such as a purification step, before entering the feed vessel.

Advantages of the Invention

Since inert $C_8$ components are separated and removed from the process, they don't accumulate in the process.

When the inert components are removed, the energy consumption of the process and the cost of operation are reduced due to the decreased recycle amounts. These components can be further used as such or they can be treated for instance by isomerising or hydrogenating.

The FIGURE is an exemplary representation of a process where ethylene is polymerized together with 1-octene in a solvent comprising 3-7 carbon atoms. Inert $C_8$ components are removed via a purge.

In the FIGURE a stream of a solution is directed to a flash (not shown). In the flash a liquid phase comprising the polymer and a vapour phase coexist. A concentrated solution stream and a vapour stream (8) are withdrawn from the flash. A part of the vapour stream (8) is passed to a first distillation column (1). The flash may be preceded by one or more flashes. In case of two or more subsequent flashes, a part of each vapour stream is passed to the first distillation column. From the first distillation column (1) a first overhead stream (16) and a first bottom stream (9) are withdrawn. The first bottom stream (9) is passed to a second distillation column (2). A second overhead stream (10) and a second bottom stream (11) are withdrawn from the second distillation column (2). The second bottom stream (11) comprises of component such as hydrocarbons having 10 or more carbon atoms. A part of the second overhead stream (10) is withdrawn as a purge stream (12). Inert $C_8$ components, such as isomers of octene, are removed via the purge stream (12). The remaining part of the second overhead stream (10) comprising 1-octene may be passed via line (13) to a feed vessel (6). The first overhead stream (16) is passed to a third distillation column (3). A third overhead stream (17) and a third bottom stream (18) are withdrawn from the third distillation column (3). The third overhead stream (17) is passed to a fourth distillation column (4). A fourth overhead stream (20) and a fourth bottom stream (19) are withdrawn from the fourth distillation column (4). The fourth overhead stream (20) comprising ethylene may be passed to a compressor (7), line (21) and to the feed vessel (6). A part of the fourth overhead stream (20) can be withdrawn as another purge stream (24). Components such as ethylene and hydrogen can be removed via this purge stream (24). The fourth bottom stream (19) comprising solvent may be passed to the feed vessel (6). A feed stream is withdrawn from the feed vessel (30). The feed stream is passed to a polymerization reactor (not shown) via a cooling step (not shown).

EXAMPLES

Computer simulations were performed using Aspen 8.8 computer software. In the simulation ethylene and 1-octene were polymerised in n-hexane in a polymerization reactor. A product stream was withdrawn from the polymerization reactor. The product stream was subjected to three subsequent flashing steps. From each flashing step a part of a vapour stream was directed to a first fractionator. A bottom stream from the first fractionator was passed to a second fractionator. In Inventive Example a part of an overhead stream from the second fractionator was recovered as a purge stream from line (12). In Comparative Example a part of the bottom stream from the first fractionator was recovered as a purge stream from line (9). The purge streams in different positions are compared in Table 1.

TABLE 1

|  | IE | CE |
|---|---|---|
| Purge stream |  |  |
| n-Hexane | 1.2 kg/h | 1.2 kg/h |
| 1-Octene | 115.1 kg/h | 117.3 kg/h |
| trans-2-Octene* | 101.0 kg/h | 103.0 kg/h |
| $C_{10+}$** | 0.0 kg/h | 8.8 kg/h |
| Second bottom stream from the second fractionator |  |  |
| 1-Octene | 10.1 kg/h | 7.9 kg/h |
| trans-2-Octene* | 8.8 kg/h | 6.9 kg/h |
| $C_{10+}$** | 40.0 kg/h | 31.2 kg/h |

*Only trans-2-octene is considered in the simulation, but in actual process other isomers of octane where double bond is not located in 1-position may be present. Also octane may be present.
**Hydrocarbons with 10 or more carbon atoms are considered in the simulation, but in actual process also hydrocarbons with 9 carbon atoms may be present.

From the comparison it can be seen that the $C_6$ and $C_8$ flows are almost similar in IE and CE. However, a clear difference can be seen in $C10_+$, i.e heavies, stream; in IE there are no heavies whereas in CE the heavies stream is 8.8 kg/h. This means that the first purge stream is free of heavies and can be used as a gasoline or fuel additive without any extra fractionation steps.

The invention claimed is:

1. A process for removing hydrocarbons comprising the steps of:
    (A) passing a stream of a solution into a separator wherein a liquid phase comprising polymer and a vapour phase coexist;
    (B) withdrawing a vapour stream and a concentrated solution stream from the separator;
    (C) passing at least a part of the vapour stream into a first fractionator;
    (D) withdrawing a first overhead stream and a first bottom stream from the first fractionator;
    (E) passing the first bottom stream to a second fractionator;
    (F) withdrawing a second overhead stream and a second bottom stream from the second fractionator;
    characterised in that at least a part of the second overhead stream is withdrawn as a purge stream.

2. The process according to claim 1 wherein the stream of the solution comprises 1-octene and n-hexane and a mixture of isomers of 1-octene and n-octane.

3. The process according to claim 2 comprising a step of purging isomers of 1-octene and n-octane with the purge stream.

4. The process according to claim 3 comprising the additional step of:
    (G) passing optionally at least a part of the second overhead stream to a polymerization reactor.

5. The process according to claim 3 comprising the additional step of:
    (H) passing the first overhead stream to a third fractionator;
    (I) withdrawing a third overhead stream and a third bottom stream from the third fractionator;
    (J) passing the third overhead stream to a fourth fractionator;
    (K) withdrawing a fourth overhead stream and a fourth bottom stream from the fourth fractionator;
    (L) passing optionally at least a part of the fourth overhead stream to the polymerization reactor.

6. The process according to claim 3 comprising the additional step of:

(M) passing optionally at least a part of the fourth bottom stream to the polymerization reactor.

7. The process according to claim 3 comprising the additional steps of:
(N) passing optionally at least a part of any of the second overhead stream, fourth overhead stream or fourth bottom stream to a feed vessel;
(O) withdrawing a feed stream from the feed vessel;
(P) passing the feed stream via a cooling step to the polymerization reactor.

8. The process according to claim 3 wherein the stream of the solution comprises ethylene.

9. The process according to claim 3 wherein any of the first, second, third or fourth fractionators are distillation columns, stripping columns, multi-phase separators, extractors or liquid-liquid separators.

10. The process according to claim 3 wherein at least a part of the purge stream is used as a gasoline additive or as a fuel additive.

11. The process according to claim 3 wherein at least a part of the purge stream is sent to a hydrogenation step.

12. The process according to claim 3 wherein at least a part of the purge stream is sent to an isomerization step.

* * * * *